United States Patent Office 3,520,118
Patented July 14, 1970

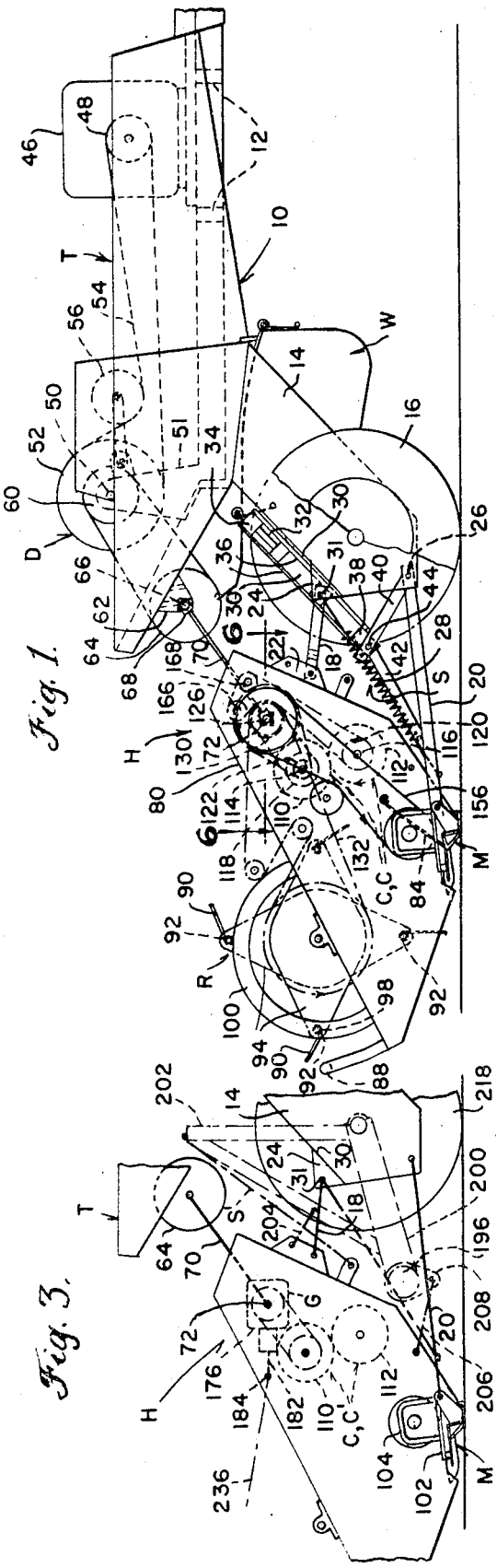

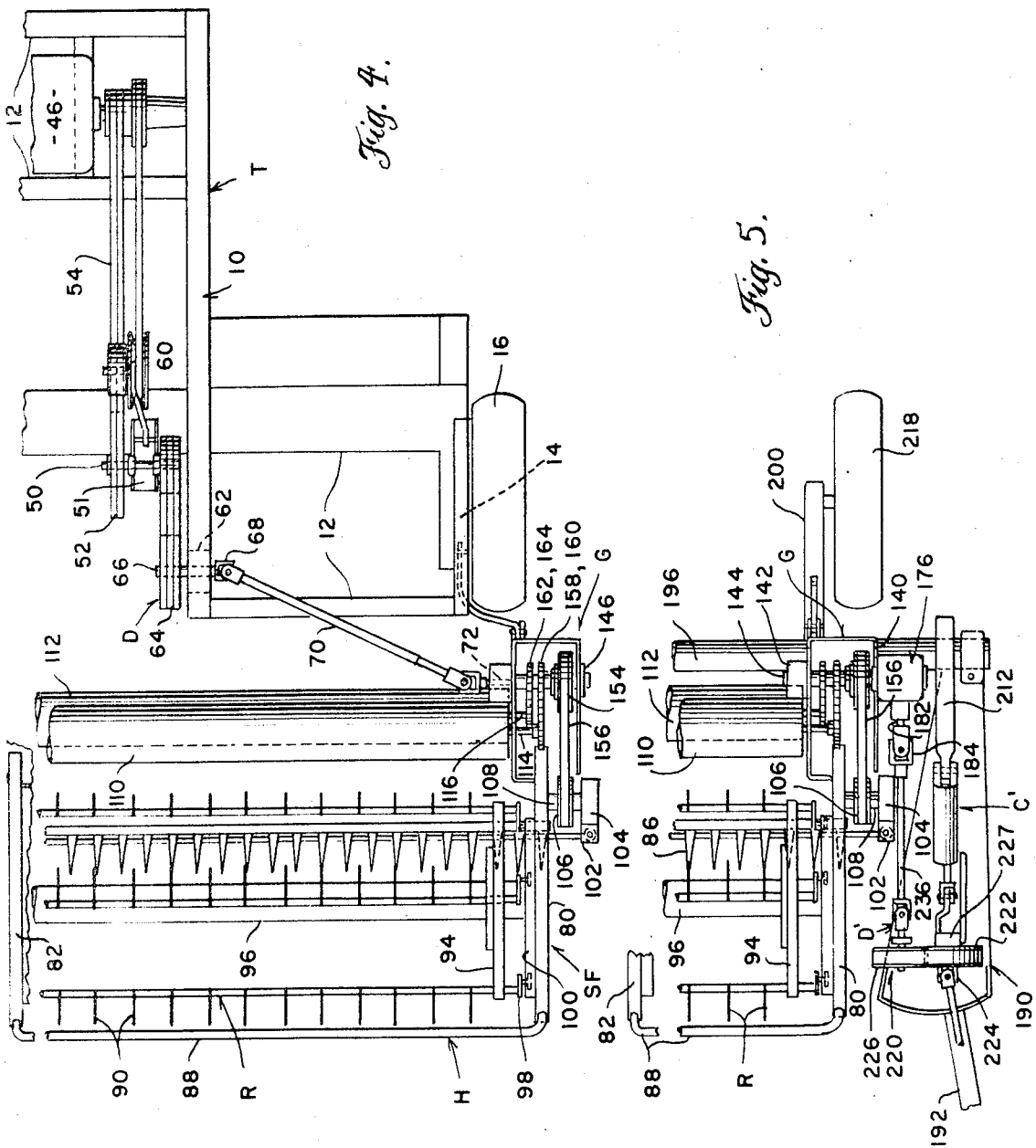

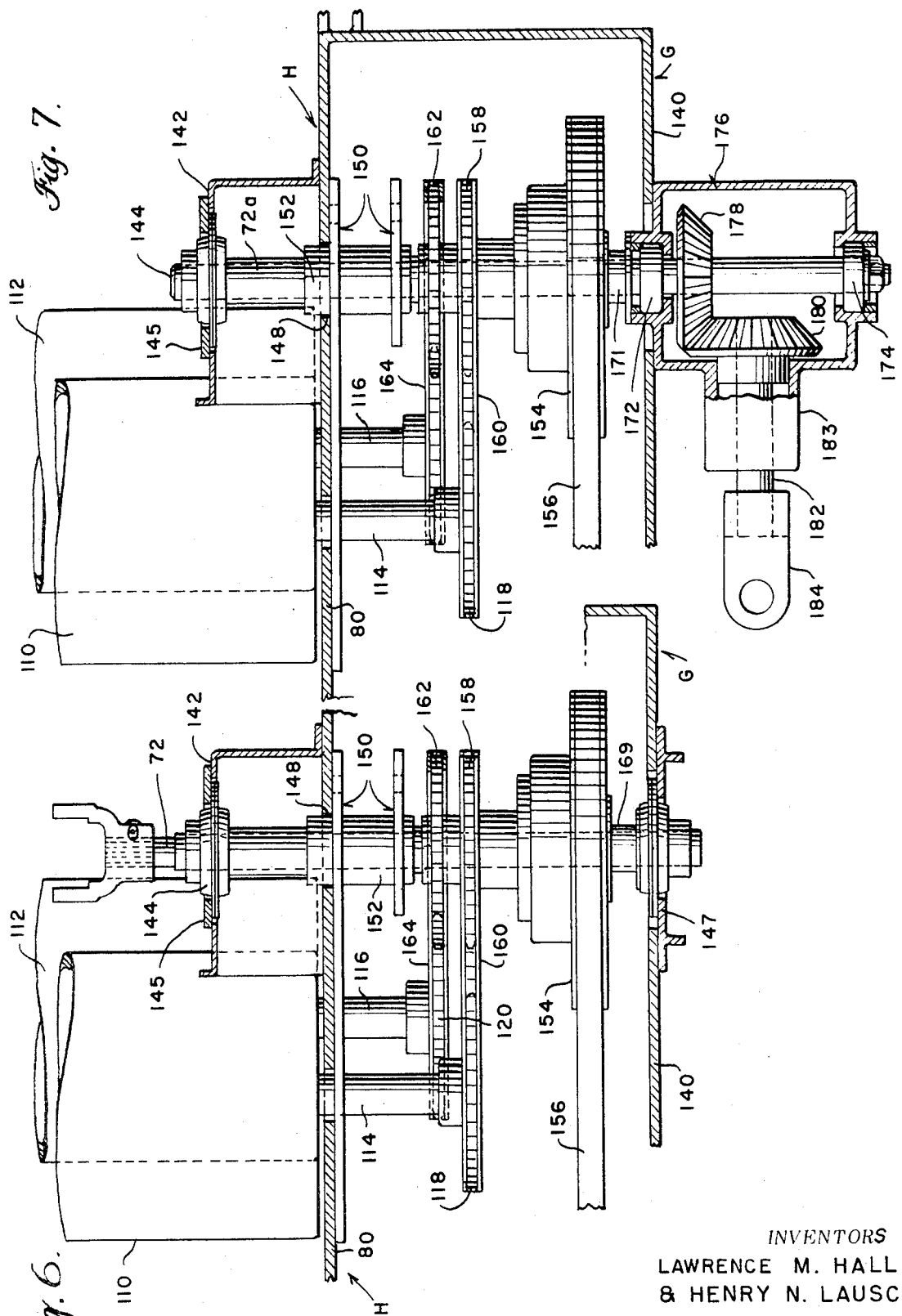

3,520,118
INTERCHANGEABLE HEADER FOR USE WITH TRAIL-TYPE AND SELF-PROPELLED AGRICULTURAL HARVESTING MACHINES
Lawrence M. Halls, New Holland, and Henry N. Lausch, Leacock, Pa., assignors to Sperry Rand Corporation, New Holland, Pa., a corporation of Delaware
Filed July 26, 1968, Ser. No. 747,908
Int. Cl. A01d 69/00
U.S. Cl. 56—10                                    18 Claims

ABSTRACT OF THE DISCLOSURE

An adjustable crop gathering header unit primarily for mowing, conditioning, and windrowing crop material, said header unit being interchangeable for use on harvesting machines of both the trail type and the self-propelled type.

BACKGROUND OF THE INVENTION

This invention relates generally to adjustably mounted crop gathering headers for use with agricultural harvesting machines. Agricultural harvesters with which headers of this invention are more commonly associated fall into two categories. One is the draft or pull type machine which is towed behind a tractor and embodies a header which is vertically adjustable or raisable about a horizontal axis to accommodate varying heights of crop material and to permit said header to raise to a transport or service position. The second type of header is of the type which is normally fixed relative to the machine frame usually of the self-propelled type, and is adjusted by raising and lowering the entire machine frame.

In several of the current header forms, the crop harvesting elements comprise mowing means, crop conditioning roll means and crop reel combing or raking means for raking the crop across the cutter means and directing it into the crop conditioning roll means, whereupon it is discharged rearwardly into the swath or into a windrow forming means. With respect to the pivotally mounted header, the crop harvesting elements are normally mounted on a subframe which is journalled on a portion of a main frame structure, and pivotal about a transverse rockshaft of the main frame structure by means of a hydraulic actuator or other suitable means. The sub-frame is resiliently supported on the main frame for lateral floatation so that it can follow the contour of the ground. The header's crop harvesting means receive their respective drives through a drive system part of which is interchangeably coupled to either the draft vehicle's power-take-off or to the drive shaft and drive line means of the self-propelled vehicle.

Prior to the development of the articulated type of frame used in the pull type harvester of this character, it had been difficult to obtain the necessary lift of the crop treating elements of the header which had to be mounted rather closely to the pivotal axis; and further, due to the amount of weight involved, the size of the headers which could be mounted in this way were somewhat limited.

With respect to the fixed type of header mounting on the prior art self-propelled machines, when vertical adjustment was desired the entire frame had to be raised or lowered. While in this latter mounting, an advantage of strength and rigidity was achieved together with a more desirable location of the crop treating elements, because for each vertical adjustment all of the elements were moved an equal amount. However, the disadvantage thereof was that a considerable amount of energy was required to perform the adjustment feature thereby requiring extremely heavy duty construction and more expensive components on the machine. Because of the additional weight, precise adjustment of the headers was more difficult.

In the past, due to the complexities attendant the engineering of machines of both the pull and self-propelled type, it has been the practice to design and fabricate separate headers for use with separate machines. Due to the inherent relative complexity of the machines and the current relatively high cost of engineering and manufacturing attendant therewith, the economics thereof dictate reducing and eliminating costs wherever possible in order that the ultimate machine may be retailed at as reasonable a price as possible.

It is therefore apparent that it would be desirable to design and manufacture but a single header component or a unit which would be adaptable for use in more than one major piece of farm machinery. Furthermore, from a dealer standpoint, it would be desirable to have a single interchangeable header to facilitate transfer or salvage of used trade-in equipment, with as many parts as possible being interchangeable to facilitate evolving an inexpensive, readily workable and dependable used piece of equipment.

SUMMARY OF THE INVENTION

The present invention is directed preferably to harvesting headers of the mower-conditioner type, designed for use in an interchangeable manner with agricultural harvesting machines of the pull-type and those of the self-propelled type for performing the same function. Machines of this type, require that the header be adjustable vertically to accommodate varying heights of crop material and to permit the header to be raised substantially to intermediate or fully raised positions to facilitate servicing or transport of the machine when not in harvesting use. The header generally comprises a sub-frame having mounted thereon a mower for severing the crop material, a reel for raking the material rearwardly past the mower means, and conditioner rolls which receive the crop material from the reel, condition it and simultaneously discharge it rearwardly into swath or windrow forming means. The drive means for the crop treating elements include several rotary drive members certain of which are mountable on a selectable one of a pair of selectively interchangeable output shafts, each having means at one end thereof for connection with the related drive line means from a prime power source associated with the particular machine on which it is mounted. Additionally, selective pivotal mounting links and counterbalancing spring means are interchangeably used to mount a header on a particular machine frame.

Accordingly, a principal object of the invention is to provide an improved header assembly which affords high operating efficiency and an improved pivotal mounting thereof adaptable for use on both the pull-type as well as the self-propelled type of agricultural harvesting machines.

Another object of the invention is to provide an improved adjustable header structure which can be raised and lowered by the combined action of pivoting the header about a supporting frame, while simultaneously raising and lowering the articulated supporting main frame thereby realizing the advantages of rigidity in the crop treating element orientation obtainable primarily only with the prior art type of fixed header mounting.

Still another object is to provide an improved interchangeable header of the aforesaid character, wherein said changeover is achieved by the selective mounting of one of a pair of output drive shafts having common output drive means associated in the intermediate area of the shaft but having different drive means associated with opposite ends of said respective shafts depending upon the type of machines with which the header is to be associated; and, said interchangeability being achieved by the further selective use of different length attaching links for a given type of machine.

A further object of this invention is to provide a pivotally mounted header wherein the header's center of gravity is located closely adjacent the pivotal axis to facilitate adjustment of said header.

These and other objects and advantages of the invention will become more apparent from reading the detailed specification taken in conjunction with the illustrative drawings.

DESCRIPTION OF THE DRAWINGS

FIG. 1 is a fragmentary side elevational view of a self-propelled mower-conditioner harvesting machine, illustrating the linkage for connecting the header to the self-propelled frame tractor, and showing the drive connection from the tractor vehicle to the header;

FIG. 2 is a view similar to FIG. 1 but showing the header in its relative mounted position on a pull-type machine;

FIG. 3 is a diagrammatic, fragmentary side elevational view, depicting in composite form the linkage and drive connection of a self-propelled machine shown fragmentarily in full lines, and those of the pull-type machine shown fragmentarily in dot and dash lines;

FIG. 4 is a fragmentary plan view of the machine of FIG. 1;

FIG. 5 is a fragmentary plan view of the machine shown in FIG. 2;

FIG. 6 is an enlarged horizontal cross sectional view taken substantially on the line 6—6 of FIG. 1; and FIG. 7 is an enlarged horizontal cross sectional view taken substantially on the line 7—7 of FIG. 2, and wherein a comparison of FIGS. 6 and 7 depict the minor change in the drive shaft component attendant the interchangeable mounting of the header of this invention on either of the pull or self-propelled type of machines.

DESCRIPTION OF PREFERRED EMBODIMENT

Referring more particularly to FIGS. 1, 2 and 3, the improved header of this invention, designated generally H, is resiliently mounted upon a self-propelled tractor vehicle T by means of a suspension system designated generally S. The header comprises various crop treating elements which are driven by a suitable drive system designated generally D. A tractor frame-mounted lift means including a piston and cylinder means C is utilized for vertically adjusting the header with respect to the tractor frame.

Referring to FIG. 2 embodiment, it will be seen that the same general header designated H' is mounted on a pull-type frame P adapted to be towed behind a draft vehicle or tractor T', shown fragmentarily. The header H' is resiliently mounted to the frame P by means of a suitable suspension system S', with the header being pivotally raiseable about a predetermined transverse axis by means of a similar lift system embodying suitable cylinder and piston means C'. A drive train system D' provides the necessary drive to the crop treating elements carried on the header H'.

The headers H comprise a sub-frame SF which supports the crop treating elements including a mower preferably of the reciprocable sickle type designated M, a crop engaging reel R which serves to rake the crop material across the sickle mower and directs the cut material into crop conditioning roll means designated C, C, whereupon the conditioned crop material is discharged rearwardly into selective windrow or swath forming means W mounted behind the machine.

Having generally described the principal components of the header and the two different types of machines with which it is interchangeably associated, a more detailed description of the various components will now be undertaken. Referring to FIGS. 1 and 4, the self-propelled tractor machine T includes a framework having longitudinally extended members 10 interconnected by a plurality of transverse frame members 12. A pair of depending forward legs 14 are attached to portions of the frame member 12 and serve to mount the forward laterally spaced wheels 16. The main frame of the tractor T is generally triangular in top plan view and is provided at the rearwardmost end thereof with at least one steering wheel, not shown.

The header H is attached in part to the machine frame's depending legs 14 by means of upper and lower link members 18 and 20 respectively. The upper links 18 are pivotally pinned to brackets 22 provided on the rearward wall of the header H, and to bracket 24 provided on legs 14. The lower links 20 are pivotally attached also to a lower portion of the header, preferably to brackets mutually adjoining with the lowermost part of the sub-frame and mower means M at the forward portion of the links and by means of suitable pins, as at 26, to the lowermost portions of legs 14. The header is additionally supported by counterbalancing springs 28 attached at one end adjacent the lower lateral sides of the header and at the upper end of the springs to the pivot means on bracket 24 to which the links 18 are also secured.

Means to raise and lower the header are provided in the form of cylinder and piston means designated generally C. This lifting means C comprises a conventional fluid pressure cylinder and piston assembly 30 having an extendable piston shaft 32 terminating in an upper head portion 34. A pair of lifting or torsion arms 36, 36 are fixedly attached to the upper piston head 34 and extend downwardly adjacent the cylinder and therebeyond to a lower fitting 38. Said arms 36, 36, in turn, are attached to rigidly joined link members 40 and 42 and by bolt 44. The lower portions of said links 40 and 42 are rigidly connected to and define a triangular lifting member with the lifting link 20 aforesaid.

The drive system D is powered from the primary power source of the tractor, preferably an internal combustion engine 46, which is provided with suitable drive train means including a drive shaft on which an output drive pulley 48 is attached. Spaced forwardly therefrom is an intermediate output shaft 50 supported on a suitable bearing mount 51. A driven pulley 52 of larger diameter than drive pulley 48, is mounted on shaft 50 and the drive belt 54 is entrained about the pulleys 48 and 52. A tension idler pulley 56, pivotally mounted on the aforesaid bracket 52, may engage the belt 54. Also attached to intermediate shaft 50 is a smaller diameter, step up, multiple belt pulley 60. In alignment forwardly thereof and attached to the framework 10 by brackets 62 is a complemental multi-belt pulley 64 mounted on an intermediate rotary output shaft 66. Shaft 66 is relatively short in length and at the end opposite the pulley 64 there is provided a universal connecting yoke 68. A telescopic universal PTO output shaft 70 interconnects shaft 66 with the preselected output shaft 72 which is rotatably mounted in the gearbox housing G on the header frame H.

Reverting now to the header H, said header as shown includes the subframe SF for supporting the crop treating components. The sub-frame SF comprises side panels or frames 80 and 82, an inclined floor or crop guiding plate 84 (FIGS. 1 and 2) extending between and joining the side panels of their lower edges, a rigid cutter bar 86 of the mower assembly M, of which bar 86 also adds rigidity to the sub-frame, and a crop engaging bar 88 which extends across the forward end of the sub-frame.

The reel R is rotatably journalled in the header side panels 80 and 82 and has crop engaging tines 90 which are carried on a plurality of transversely extended tine bars 92 disposed at the outer periphery of the reel. The bars 92 are suitably journalled within reel spiders 94 which are laterally spaced and carried on a reel shaft 96. Each of the bars 92 has a crank arm and roller type cam follower assemblies 98, the follower of which rides in a channel shaped cam track 100 causing the tines to travel in a desired path in a well known conventional manner.

The mower M is of conventional design and, in addition to the cutter bar 86, it includes a conventional sickle guard, and a sickle bar which is pivotally connected to the forward end of a fore-and-aft extended rocker arm as at 102. The rocker arm is reciprocated in a conventional manner by wobble drive 104 which receives power from a driven pulley attached to shaft 108 which is suitably journalled within the side panel 80 of the sub-frame.

Also carried on the header sub-frame are the crop conditioning means C, which comprise an upper conditioning roll 110 and a coacting lower conditioning roll 112, both of which are rotatably mounted in the header side panels at a location rearwardly of the mower and reel. Said rolls are disposed rearwardly above the mower and in such a manner that the bight of the rolls is disposed a short distance above and behind the floor plate 84, and preferably such that a plane through the axes of the rolls defines an acute angle with respect to the horizontal at the infeed side of the rolls. The conditioner rolls are mounted for adjustment relative to one another, as by means 150, to compensate for different loads of crop material and are mounted in a conventional manner by appropriate bearing and bracket hardware provided in association with the side panels of the sub-frame. Said rolls are disposed for rotation in opposite directions about their respective shafts 114 and 116, by means of appropriate drive sprockets 118 and 120 respectively.

The drive for the reel is taken from the far right end of upper conditioning roll shaft 114 which has a small drive sprocket 122 attached thereto in alignment with a step-up larger diameter drive sprocket 124 fixed on a rotatable stub shaft 126 and disposed preferably in axial alignment with output shaft 72 carried on the left side of the header sub-frame panel 82. Outwardly of said sprocket 124 is a drive pulley 130. Drive belt 132 interconnects the drive pulley 130 with the pulley 134 affixed in the end of the reel shaft adjacent panel 82 of the sub-frame unit. A more detailed explanation of the drives for the header components may be had by reference to copending application Ser. No. 747,901, filed June 26, 1968.

The gearbox housing G is affixed to the sub-frame of the header, preferably adjacent an upper end of the left side panel 80. Gearbox G includes offset support means in the form of suitable, laterally spaced support members 140, 142 suitably attached to header panel 80. The output shaft 72 is removably journalled within horizontally aligned bearings 144 and 146 removably disposed on support members 140 and 142 respectively. Aperture 148 cut through an offset or continuation of side panel 80 provides clearance for said shaft 72. Shaft 72 is preferably keyward in the medial area between support 140 and 80 to have keyed thereon the various implement drive sprockets or pulleys, to be described, including a non-keyed, adjustable support means 150 having a sleeve bearing 152, one end of which projects through clearance aperture 148, and within which the shaft 72 freely rotates. The plurality of implement drive components on shaft 72 include those for driving the upper and lower conditioning rolls, and the drive member for imparting drive to the mower means M. Said drive components are laterally spaced and preferably keyed on shaft 72, and include a drive pulley 154 around which drive belt 156 drivingly engages pulley 106 of the wobble unit. An adjustable idler pulley may be provided for engagement with belt 156 to maintain proper tension on said belt. Moving inward or right of pulley 154 is a spacer sleeve or collar 155 and then a first drive sprocket 158 disposed in alignment with sprocket 118 on the shaft 114 of the upper conditioning roll 110. Drive chain 160 embraces both sprocket 118 and 158 to impart drive from the latter to the former. Inwardly or to the right of the sprocket 158, there is a second drive sprocket 162 disposed in alignment with sprocket 120 on the lower conditioning roll shaft 116. The drive chain 164 embraces both of said sprockets 162, 120 and imparts drive from the output shaft 72 to the lower conditioning roll shaft 116. The drive to the upper conditioning roll 110 is such that it drives the roll in a counterclockwise direction, whereas opposite and clockwise rotation is imparted to the lower conditioning roll 112 by the directing of drive chain 164 over a pair of reversing idler sprockets 166 and 168 (FIG. 1) before embracing the sprocket 120.

The shaft 72 used in conjunction with the drive line of this self-propelled unit is elongated on the inner or right end thereof to receive a universal joint yoke 170 for cooperative connection with the telescopic universal PTO shaft 70 aforesaid. Said shaft 72 preferably terminates closely beyond the bearing 146 in the outer or left support wall 140 of the gear housing G. The yoke 170 and end of shaft 72 are preferably complementally splined, notched and apertured to facilitate rigid mounting thereof. Suitable spacer and washer hardware, together with brackets 145 and 147, all of a generally uniform nature, are utilized to facilitate the interchangeable mounting of the selective shafts 72, 72a and related drive components, except for spacer collars 169 and 171 used adjacent pulley 154, wherein spacer 169 is noticeably longer (FIG. 6) than spacer 171 (FIG. 7).

With respect to the pull-type mower-conditioner harvesting machine, the header and drive components thereof remain the same except for the first-mentioned output shaft 72, which in this instance is selectively replaced by the second shaft 72a as better seen in FIG. 7. By comparison of FIGS. 6 and 7 it will be seen that shaft 72a terminates more closely adjacent bearing 144 inasmuch as there is no necessity for a yoke element 170 to be attached to this shaft end, whereas the left portion of the shaft 72a is of longer length and is unitarily supported by a pair of aligned bearings 172 and 174 provided at opposed sides of a bevel gearbox unit 176, the latter of which is attached as by bolts (not shown) to the support wall or panel means 140 of the gear housing G in place of bolted bracket 147. Said gearbox unit 176 is provided with right angularly disposed bevel gears 178 and 180, wherein bevel gear 178 is affixed to the shaft 72a and bevel gear 180 is affixed to a shorter shaft 182 supported in bearing hub 183 at substantially right angles to shaft 72a. Shaft 182 serves as the input shaft of this latter gearbox unit and is provided with a universal yoke 184 on its outer end for connection with the counterpart of a universal drive line to be powered by the PTO of the draft vehicle tractor T.

Referring now in more detail to the pull-type machine designated generally at P, it comprises an L-shaped main frame including a fore-and-aft directed leg portion designated generally at 190 and having a forwardly extended pivotal drawbar 192, the latter of which is pivotally attached also at its forward end to the conventional drawbar 194 of the draft tractor T. The main frame further includes a transversely extended second leg 196 which is rotatable about its axis and upon which frame member 190 is pivotally mounted as by a pair of sleeve bearings 198; a pair of laterally spaced arms 200, 200 which serve as bases of a pair of rigid composite, triangular shaped, wheel and header frames 202, 202. The triangular frames 202 are independently mounted and pivotal about the transverse rockshaft 196 to provide independent support of the lateral sides of the header H. As shown in FIG. 2, the header H' is supported by pairs of upper and lower links 204 and 206, respectively, connected to a medial portion of the triangular frame work and to lug members 208 affixed to and depending from rockshaft 196. Furthermore, counterbalancing springs 210 are attached to lateral sides of the header and to the apex of the triangular frames 202 as shown, to provide resilient support therefor.

Means for lifting the header from the lowered operating position to an intermediate or fully raised transport position include a piston and cylinder device C', a heavy duty lift arm or bell crank lever 212 rigidly attached to the rockshaft 196, and a fixed support bracket 214 secured on a forward portion of the main longitudinal frame 190 in aligned position with lift arm 212. The piston device C' is interposed between the lift arm and a support bracket aforesaid. Reference may be had to copending application Ser. No. 751,153, filed Aug. 8, 1968 for a more detailed description of the pull-type frame and header as mounted thereon.

The sub-frame SF used in conjunction with the pull-type frame is provided with crop deflecting baffle means W' to aid in the selective formation of consolidated windrows or full width swaths of crop material. Said means W' are only shown generally as they function generally as they function generally the same as and are more fully described in copending U.S. application Ser. No. 734,098, filed June 3, 1968.

Similarly, the self-propelled machine is provided with suitable crop deflector baffles comprising the swath or windrow forming means W (FIG. 1). Said means W are disposed above and behind the crop conditioning roll means, and are only shown generally as they function similarly to and as described more fully in U.S. Pat. 3,383,844, issued May 21, 1968.

A brief description of the complete machine operation will suffice for purposes hereof. When the header H' is raised responsive to action of the lifting cylinder C', as by means of a source of fluid pressure connected thereto by means of flexible lines, not shown, from the draft vehicle power source, the whole header in addition to being pivotally raised about the transverse axis of rockshaft 196, in a general sense, is also vertically raised due to the articulated form of the frame structure consisting of the L-shaped main frame and the independently articulated triangular frames 202 which support both the header H' and the ground wheels 218. This becomes apparent when the lift arm 212 and rockshaft 196 rotate about the axis of the latter, responsive to expansive action of the cylinder means C', which action, in turn, through the link suspension means S' causes the independent frame 202 to pivot rearwardly and upwardly about the horizontal axis of the ground engaging wheels 218. In this manner a positive vertical adjustment of the header component is achieved corresponding to that as would otherwise be achieved by a header mounted on a fixed frame unit as described in the preamble hereof, but minus the attendant disadvantages attributed thereto.

The drive system D' for the driving of the various header components may include any suitable drive means, such as shown or as alternately disclosed in more detail in copending application Ser. No. 747,901, filed June 26, 1968. For purposes hereof, the specific form illustrated in FIG. 2 will be briefly described. This drive system embodies the intermediate pivotally mounted drive belt unit 220 disposed on the forward end of longitudinal frame member 190, and has a lowermost drive pulley 222 mounted on shaft 224 which is disposed substantially in horizontal alignment with the power-take-off shaft 228 and which is interconnected thereto by means of a telescoping shaft 230 and a fixed shorter universal shaft 232.

The said unit 220 further comprises an upper mounted drive pulley and shaft assembly 226 rotatably mounted on the pivotal frame 227 and angularly offset from the pulley 222 therebelow so as to be disposed in substantially fore-and-aft alignment with the input shaft 182 of the gearbox unit 176. A fixed length universal connecting shaft 234 interconnects the drive of the upper pulley with the input shaft 182 of the gearbox. The utilization of the pivotal mounted intermediate drive belt unit 220 permits the header H' to be raised and lowered while maintaining minimum angular variation in the drive shaft 236 thereby reducing angular acceleration and torque load factors inherent in many of the drive systems.

From the foregoing description, it will be seen that a header for performing the combination of mowing and conditioning the crop material has been evolved which readily lends itself to use with both the pull-type and self-propelled type vehicles. When it is desired to interchange the headers, it is only necessary to detach the respective link and spring mountings and to release the respective drive chains and drive belts of the output shaft drive sprocket and pulley components, whereby a selective change of the input shafts 72 or 72a and related hardware may be readily effected. To facilitate the transition, it is preferable that a suitable pilot rod or shaft be used to temporarily suspend the respective bearings, conditioning roll support, drive sprockets and drive pulley thereon in their respective positions to facilitate their remounting upon one of the selected shafts 72 or 72a, while replacing spacer 169 with spacer 171.

Accordingly, a header of the character described which is readily adaptable for use with both of the aforementioned machines has been evolved which achieves all of the objectives and advantages as set forth in the preamble hereof.

While this invention has been described in connection with a particular embodiment thereof it will be understood that it is capable of modification, and this application is intended to cover any variations, uses or adaptations following in general the principles of the invention including such departures from the present disclosure as come within known or customary practice in the art to which the invention pertains, and as fall within the scope of the invention or the limits of the appended claims.

Having thus described our invention what we claim is:

1. A crop harvesting header interchangeably mounted on the forward portion of a pull-type machine frame and a self-propelled machine frame, each respectively having drive train means operably connected with the PTO means of an associated prime power source, comprising in combination:
    (a) a sub-frame of substantial width including laterally spaced side members;
    (b) means for mounting said sub-frame selectively on said machine frames for vertical movement relative to the ground;
    (c) driveable crop harvesting means on said header sub-frame;
    (d) drive means including one of a pair of selectively mountable rotary output shaft means supported on said sub-frame for driving the crop harvesting means;
    (e) means for interchangeably mounting said selective output shaft upon and in a transverse manner to a side member, and including removable shaft support bearings carried by said sub-frame side member to support the shaft near the opposite ends of the shaft;
    (f) said shaft having one end projecting from one of the support bearings as carried by said one side member and extending a relatively short distance toward the opposite side member of the sub-frame; and
    (g) means mounted on said projecting shaft end for disconnectable driving engagement with the drive line of the associated machine frame.

2. A crop harvesting header as defined in claim 1, wherein the meanes of paragraph (b) includes selective pairs of mounting links attachable between lug means on the header and on the associated machine frame.

3. A crop harvesting header as defined in claim 1, wherein the means of paragraph (b) includes selective pairs of mounting links and counter-balancing spring means selectively attachable between the header and the associated machine frame.

4. A crop harvesting header as defined in claim 1, wherein the output shaft means of paragraph (d) include rotatable shaft members of relative short length, and having at least one key way intermediate the ends; and said drive means further include rotary drive members keyed to a medial portion of said shafts.

5. A crop harvesting header as defined in claim 1, wherein the crop harvesting means includes crop conditioning co-acting roll means.

6. A crop harvesting header as defined in claim 1, wherein the other of the pair of selectively mountable output shafts is provided with a bevel gear near one end, a gearbox enclosing said bevel gear and said one end of the shaft, a second bevel gear housed within the gearbox and in intermeshing relation with the first-mentioned bevel gear.

7. A crop harvesting header as defined in claim 1, wherein the other of the pair of selectively mountable output shafts is provided with a bevel gear near one end; a gearbox enclosing said bevel gear and said one end of the shaft; a second bevel gear housed within the gearbox and in intermeshing relation with the first-mentioned bevel gear; said gearbox having opposed unitary shaft support bearings therewith one of which is disposed adjacent the fiirst-mentioned bevel gear; and mounting means for mounting said gearbox and latter shaft on said one sub-frame side in place of the aforesaid selective shaft and the corresponding shaft support bearing therefor.

8. A crop harvesting header as defined in claim 1, wherein the other of the pair of selectively mountable output shafts is provided with a bevel gear near one end; a gearbox enclosing said bevel gear and said one end of the shaft; a second bevel gear housed within the gearbox and in intermeshing relation with the first-mentioned bevel gear; said gearbox having shaft support bearings unitary therewith and one of which is disposed adjacent the back of the first bevel gear; mounting means for mounting said gearbox and shaft on said one sub-frame side in place of both the aforesaid output shaft and its corresponding shaft support bearing therefor, with said unitary gearbox projecting away from both of said sub-frames side members.

9. A crop harvesting header as defined in claim 6, with the end of the shaft opposite the gearbox being supported in one of said support bearings of paragraph (e) (claim 1) and having rotary drive members constituting part of the drive means of paragraph (d) (claim 1) affixed to the shaft intermediate said latter end and the gearbox.

10. A crop harvesting header as defined in claim 6, wherein the axes of the intermeshing bevel gears are substantially at right angles;
a stub shaft on which said second bevel gear is rotatably mounted having an end which projects from the housing in a generally fore-and-aft direction of the machine; and
means on said shaft end for interengageable driving connection with input means of the drive line of the pull-type machine frame.

11. A crop treating header selectively mountable on a plurality of different types of mobile frame units each having a power drive line operatively connectable with a prime power source in association therewith, comprising in combination:
(a) a sub-frame of substantial width including laterally spaced side members;
(b) means to mount said sub-frame on said frame unit for vertical movement relative to the ground;
(c) driveable crop treating means on said header sub-frame;
(d) drive train means supported on said sub-frame for driving crop treating means, said drive train means operatively connected with the latter and with the power drive line of the associated mobile frame unit;
(e) said drive train means including first and second output drive shafts having rotary drive means attached intermediate the ends thereof when assembled on the unit, said shafts being selectively and removably mountable on the header sub-frame one at a time in conjunction with the drive train means thereon;
(f) support means for said output shafts including spaced upright members and removable bearing means mounted therein for interchangeably journalling one of said output shafts adjacent both ends thereof;
(g) said upright shaft support members being carried by and offset of the said frames side member;
(h) one end of a selectively mounted output shaft projects beyond one of shaft support members and means mounted on said projected shaft end for interengageable connection with the drive line of the associated mobile frame unit on which the header is mounted.

12. A crop treating header as defined in claim 11, wherein the rotary drive means of paragraph (e) include a plurality of rotary drive members removably affixed to a selected shaft for rotation therewith and in operative driving connection with the crop treating means of the header.

13. A crop treating header as defined in claim 11, wherein the upright support members are disposed adjacent an upper portion of one of the side members, and are offset one to each side of said side member.

14. A crop treating header as defined in claim 11, wherein the crop treating means of paragraph (c) include co-acting crop-conditioning rolls, one of which is mounted on a pivotal support means for adjustment relative to the other roll; and wherein the axis of said output drive shaft when mounted and the axis of the pivotal mounting support of the adjustable crop conditioning roll are co-axial.

15. A crop harvesting header adapted to be mounted selectively on the forward portion of a pull-type machine frame and on a self-propelled machine frame respectively having drive train means operably connected with the respective PTO means of an associated prime power source comprising in combination:
(a) a sub-frame with substantial lateral width including laterally spaced side members and having means for mounting said sub-frame selectively on one of said machine frames for vertical movement relative to the ground;
(b) driveable crop harvesting means on said header sub-frame;
(c) drive means including rotary output shaft means supported on said sub-frame for driving the crop harvesting means, with said drive means operatively connectable with the crop harvesting means and with the PTO means of a prime power source associated therewith;
(d) means for removably mounting said drive shaft means including a pair of vertically disposed support panel members connected to one of the sub-frame side members and in laterally spaced relation thereto; and
(e) said output drive shaft means rotatably journalled in said support panel members and having a plurality of rotary drive members carried thereon between said support panel members.

16. A crop header as defined in claim 15, wherein the output shaft means of paragraph (c) comprises:
(a) first and second output shafts selectively mountable to extend between siad lateral spaced supports; and
(b) said first shaft when assembled projecting beyond one of the support members and having means on the projecting end for oeprable connection with the prime power source of the associated machine frame.

17. A crop header as defined in claim 16, wherein said second shaft when so assembled has one end projecting beyond the panel supports in a direction opposite from that of which the said first shaft projected when so assembled, and having menas thereon operably connectable to the drive train means of the machine frame associated therewith.

18. A crop harvesting header selectively mountable on a pull-type frame and a self-propelled type frame, each respectively having a power drive line operably connected with a prime power source, comprising in combination:
 (a) a sub-frame of substantial width including laterally spaced side members and having means for mounting on said frames for vertical movement relative to the ground;
 (b) driveable crop harvesting means on said header sub-frame including:
  (1) crop mowing means supported by the lower portion of said sub-frame and extending between opposite sides thereof; and
  (2) crop conditioning means supported between opposite sides behind the mowing means;
 (c) drive train support means including laterally spaced apart shaft supports disposed on a portion of one of the side members;
 (d) drive trains means on said sub-frame constituting part of the power drive line for driving the crop harvesting means and including a driven output shaft journalled in said support members, rotary output drive means on said shaft intermediate the laterally spaced supports for operatively driving the crop harvesting means, and means mounted on one end of said shaft for enterengageable connection with the drive line from a power source associated therewith.

References Cited
UNITED STATES PATENTS

| | | | |
|---|---|---|---|
| 2,763,115 | 9/1956 | Skromme | 56—2 |
| 3,023,560 | 3/1962 | Krahn | 56—23 |
| 3,306,014 | 2/1967 | Halls et al. | 56—23 |
| 3,343,848 | 9/1967 | Dorschner. | |

ANTONIO F. GUIDA, Primary Examiner

U.S. Cl. X.R.

56—2, 23